United States Patent [19]
Boeck et al.

[11] 4,009,262
[45] Feb. 22, 1977

[54] ANTIBIOTIC A-28086 RECOVERY PROCESS
[75] Inventors: LaVerne D. Boeck, Indianapolis; David H. Berg, Greenfield, both of Ind.
[73] Assignee: Eli Lilly and Company, Indianapolis, Ind.
[22] Filed: Apr. 21, 1975
[21] Appl. No.: 569,712
[52] U.S. Cl. .............................................. 424/123
[51] Int. Cl.² ...................................... A61K 35/00
[58] Field of Search ................................... 424/123
[56] References Cited
UNITED STATES PATENTS
3,857,948   12/1974   Tanaka et al. ...................... 424/283

Primary Examiner—Albert T. Meyers
Assistant Examiner—Daren M. Stephens
Attorney, Agent, or Firm—Nancy J. Harrison; Everet F. Smith

[57] ABSTRACT

Recovery of an antibiotic selected from the group consisting of antibiotic A-28086 factor A, antibiotic A-28086 factor B, antibiotic A-28086 factor D, and salinomycin by acidifying the fermentation broth in which said antibiotic is produced to about pH 2.0–4.0 and separating the antibiotic with the culture solids.

10 Claims, No Drawings

ANTIBIOTIC A-28086 RECOVERY PROCESS

THE PRIOR ART

Antibiotic A-28086 factors A, B, and D and salinomycin are members of a group of polyether antibiotics. Other members of this group include monensin (U.S. Pat. No. 3,501,568); dianemycin [R. L. Hamill, M. M. Hoehn, G. E. Pittenger, J. Chamberlin and M. Gorman, *J. Antibiotics* 22, 161 (1969)]; nigericin [L. K. Steinrauf, Mary Pinkerton, and J.W. Chamberlin, *Biochem. Biophys. Res. Comm.* 33, 29 (1968)]; antibiotics A-28695A and A-28695B (U.S. Pat. No. 3,839,558); and antibiotics A-204I and II (U.S. Pat. No. 3,705,238).

SUMMARY OF THE INVENTION

We have discovered an improved method of recovering an antibiotic selected from the group consisting of antibiotic A-28086 factor A, antibiotic A-28086 factor B, antibiotic A-28086 factor D, and salinomycin. This improved method comprises acidifying, to a pH of from about 2.0 to about 4.0, the fermentation broth in which the antibiotic is produced and separating the antibiotic with the culture solids. After washing with a bicarbonate solution to neutralize any excess acidity, the separated material containing the antibiotic and culture solids may be used as a source of the antibiotic. Alternatively, the antibiotic may be separated from the culture solids and isolated as an individual compound by methods commonly employed in the fermentation art.

DETAILED DESCRIPTION OF THE INVENTION

The improved method of the present invention is useful for recovery of an antibiotic selected from the group consisting of antibiotic A-28086 A, antibiotic A-28086 factor B, antibiotic A-28086 factor D, and salinomycin.

Antibiotic A-28086 factor A and antibiotic A-28086 factor B are described in co-pending application Ser. No. 569,740, filed this even date herewith, now abandoned in favor of co-pending continuation-application Ser. No. 661,185, filed Feb. 25, 1976 which is a continuation-in-part of co-pending application Ser. No. 477,954, filed June 10, 1974, now abandoned. The following tentative structure has been proposed for A-28086 factor A:

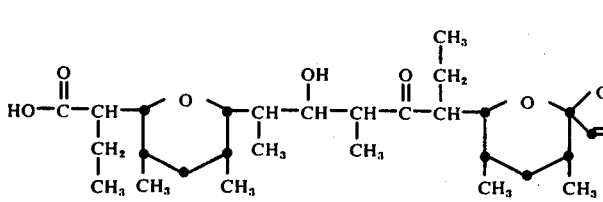

Antibiotic A-28086 factor A is a white compound which crystallizes from acetone-water and which melts at about 98°–100° C., resolidifies, and remelts at about 195°–200°C. A-28086 factor A is soluble in a variety of organic solvents such as lower alcohols, dimethylformamide, dimethyl sulfoxide, ethyl acetate, cholorform, acetone, and benzene. A-28086 factor A is only slightly soluble in nonpolar organic solvents such as hexane, and is insoluble in water. A-28086 factor A has a molecular weight of 764 and an empirical formula of $C_{43}H_{72}O_{11}$, as determined by mass spectrometry. The specific rotation of A-28060 factor A is $-54°$ ($c = 0.2$, methanol), when determined at 25° C. A-28086 factor A has a titratable group with a $pk_a$ value of 7.9 in 80 percent aqueous dimethylformamide.

Antibiotic A-28086 factor A has the following $R_f$ values in the listed paper chromatographic systems, using *Bacillus subtilis* ATCC 6633 as a detection organism.

| $R_f$ Value | Solvent System |
| --- | --- |
| 0.11 | Water saturated with methyl isobutyl ketone (MIBK) |
| 0.41 | Water saturated with MIBK plus 2% p-toluenesulfonic acid and 1% piperidine |
| 0.54 | Water:methanol:acetone (12:3:1)-adjusted to pH 10.5 with $NH_4OH$ and then lowered to pH 7.5 with $H_3PO_4$ |
| 0.48 | 1% MIBK, 0.5% $NH_4OH$ in water |
| 0.15 | 17.4 g. $K_2HPO_4$, 30 ml. ethanol per liter of water |
| 0.24 | Benzene saturated with water |
| 0.24 | Water |
| 0.75 | Water:MIBK:ethyl acetate (98:1:1) |

Antibiotic A-28086 factor A has the following $R_f$ values in two thin-layer-chromatographic systems on silica gel (precoated plates, E. Merck, Darmstadt, F-254, layer thickness 0.25 mm), using *Bacillus subtilis* ATCC 6633 as a detection organism:

| $R_f$ Values | Solvent System |
| --- | --- |
| 0.24 | Benzene:ethyl acetate (3:2) |
| 0.54 | Ethyl acetate:diethylamine (95:5) |

Antibiotic A-28086 factor B is a white crystalline compound (from acetone-water) which has a melting point of about 150°–153° C. A-28086 factor B has an apparent molecular weight of 762 and a proposed empirical formula of $C_{43}H_{70}O_{11}$ (high-resolution mass spectrometry). In the infrared spectrum of A-28086 factor B in chloroform, the following absorption maxima are observed: 2.82, 3.30, 5.77, 5.85, 6.80, 7.20, 7.50 (weak), 7.72 (weak), 7.80 (weak), 8.57 (strong), 8.68, 8.90 (strong), 9.10, 9.50, 9.83 (strong), 9.90, 10.10, 10.17 (strong), 10.43 (weak), 10.80 (weak), 11.20 (weak), 11.35 (weak), 11.73 (weak), and 12.03 (weak) microns.

The nuclear magnetic resonance spectrum of A-28086 factor B in deuterochloroform showed the following characteristics: δ 7.20, 7.09, 6.26, 6.15, 4.19, 4.12, 4.05, 3.95, 3.89, 3.78, 3.62, 3.59, 3.52, 3.48, 2.81, 2.73, 2.63, 2.54, 2.52, 1.99, 1.91, 1.84, 1.71, 1.67, 1.64, 1.55, 1.43, 1.33, 1.18, 1.11, 0.96, 0.94, 0.90, 0.87, 0.84, 0.77, 0.74, and 0.68 ppm.

The ultraviolet spectrum of factor B in ethanol shows an absorption maximum at 220 mμ ($E_{1cm}^{1\%}$ = 137.5; ε=10,477).

Although the chemical structure of A-28086 factor B has not been elucidated, the physical-chemical data thus far available indicate that factor B has a single carboxylic acid moiety, capable of forming salts, two ketone moieties, and one or more hydroxyl moieties.

Antibiotic A-28086 factor B is soluble in a variety of organic solvents such as, for example, methanol, ethanol, dimethylformamide, dimethyl sulfoxide, ethyl acetate, chloroform, acetone and benzene; but is only slightly soluble in nonpolar organic solvents such as hexane; and is insoluble in water.

Antibiotic A-28086 factor B has the following $R_f$ values in the paper-chromatographic systems indicated, using *Bacillus subtilis* ATCC 6633 as a detection organism:

| $R_f$ Value | Solvent system |
| --- | --- |
| 0.09 | Water saturated with methyl isobutyl ketone (MIBK) |
| 0.16 | Water saturated with MIBK plus 2% p-toluene-sulfonic acid and 1% piperidine |
| 0.46 | Water:methanol:acetone (12:3:1)-adjusted to pH 10.5 with NH₄OH and then lowered to pH 7.5 with H₃PO₄ |
| 0.36 | 1% MIBK, 0.5% NH₄OH in water |
| 0.33 | 17.4 g. K₂HPO₄, 30 ml. ethanol per liter of water |
| 0.51 | Benzene saturated with water |
| 0.11 | Water |
| 0.61 | Water:MIBK:ethyl acetate (98:1:1) |

Antibiotic A-28086 factor B has an $R_f$ value of 0.42 on thin-layer chromatography on silica gel (precoated plates, E. Merck, Darmstadt, F-254, layer thickness 0.25 mm) in benzene-ethyl acetate (3:2), using *Bacillus subtilis* as a detection organism.

Antibiotic A-28086 factor A and antibiotic A-28086 factor B are produced by submerged aerobic fermentation of an A-28086-producing strain of *Streptomyces aureofaciens*. Two such strains are on deposit and are part of the stock culture collection of the Northern Marketing and Nutrition Research Division, U.S. Dept. of Agriculture, Agricultural Research Service, Peoria, Illinois, 61604 and are available to the public under the numbers NRRL 5758 and NRRL 8092.

Antibiotic A-28086 factor D is described in a co-pending application of Nakatsukasa and Hamill titled ANTIBIOTIC A-28086 FACTOR D AND PROCESS FOR PRODUCTION THEREOF, Ser. No. 569,719, filed this even date herewith, now abandoned in favor of co-pending continuation-application Ser. No. 661,185, filed Feb. 25, 1976. The following tentative structure has been proposed for A-28086 factor D:

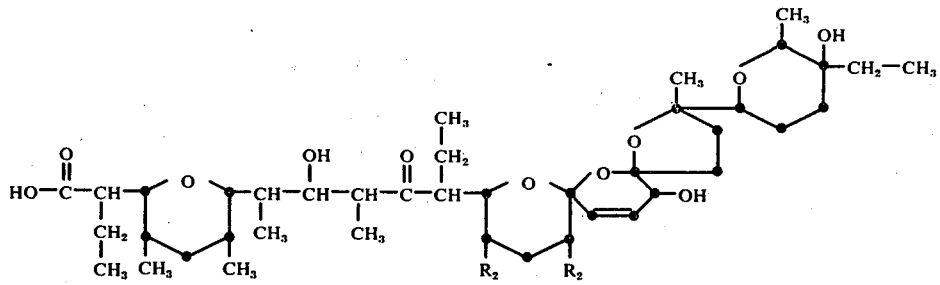

wherein either:

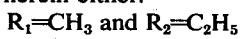

$R_1=CH_3$ and $R_2=C_2H_5$ or:

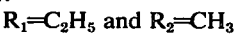

$R_1=C_2H_5$ and $R_2=CH_3$

Antibiotic A-28086 factor D is best produced by submerged aerobic fermentation of the earlier-described *Streptomyces aureofaciens* strain NRRL 8092.

Antibiotic A-28086 factor D is a white crystalline material (from water-acetone) with a melting point of about 96°–98° C. A-28086 factor D has an apparent molecular weight of 778 and an empirical formula of $C_{44}H_{74}O_{11}$, both as determined by high-resolution mass spectrometry. The specific rotation of antibiotic A-28086 factor D is −56° (c=0.1, methanol), when determined at a temperature of 25° C. Electrometric titration of A-28086 factor D in 80% aqueous dimethylformamide indicated the presence of a titratable group with a $pK_a$ value of 8.67.

Antibiotic A-28086 factor D is soluble in a variety of organic solvents such as methanol, ethanol, dimethylformamide, dimethyl sulfoxide, ethyl acetate, chloroform, acetone and benzene. A-28086 factor D is only slightly soluble in nonpolar organic solvents such as hexane and is insoluble in water.

Antibiotic A-28086 factor D has an acid function capable of forming salts and ester derivatives and at least one hydroxyl group capable of esterification.

The $R_f$ values of A-28086 factor D in various paper-chromatographic systems, using *Bacillus subtilis* ATCC 6633 as a detection organism, are as follows:

| $R_f$ Value | Solvent System |
| --- | --- |
| 0.10 | Water saturated with methyl isobutyl ketone (MIBK) |
| 0.26 | Water saturated with MIBK plus 2% p-toluenesulfonic acid and 1% piperidine |
| 0.36 | Water:methanol:acetone (12:3:1)-adjusted to pH 10.5 with NH₄OH and then lowered to pH 7.5 with H₃PO₄ |
| 0.29 | 1% MIBK, 0.5% NH₄OH in water |

| $R_f$ Value | Solvent System |
|---|---|
| 0.25 | 17.4 g. $K_2HPO_4$, 30 ml ethanol per liter of water |
| 0.26 | Benzene saturated with water |
| 0.09 | Water |
| 0.64 | Water:MIBK:ethyl acetate (98:1:1) |

Antibiotic A-28086 factor D has the following $R_f$ values in two thin-layer-chromatographic systems on silica gel (precoated plates, E. Merck, Darmstadt, F-254, layer thickness 0.25 mm), using *Bacillus subtilis* ATCC 6633 as a detection organism:

| $R_f$ Values | Solvent System |
|---|---|
| 0.26 | Benzene:ethyl acetate (3:2) |
| 0.66 | Ethyl acetate:diethylamine (95:5) |

Another substance, arbitrarily designated as A-28086-I, is co-produced with antibiotic A-28086 factors A, B and D. Although A-28086-I is not microbiologically active, it is structurally related to the A-28086 antibiotic factors. A-28086-I is a white crystalline compound (from acetone-water) and has a melting point of about 160°–162° C. Comparative studies of the NMR spectra and other properties of A-28086-I and synthetically-prepared A-28086 factor A methyl ester give evidence that A-28086-I is the methyl ester of A-28086 factor A or a closely related compound such as a stereoisomer.

Although A-28086-I initially co-precipitates with the active A-28086 antibiotic factors A, B, and D, it is readily separated from them by silica gel chromatography. A-28086-I has an approximate $R_f$ value of 0.53 on silica gel thin-layer chromatography with ethyl acetate as the eluting solvent and using vanillin spray reagent (3% vanillin in methanol + 0.5 ml. con. $H_2SO_4$ per 100 ml. of solution) for detection. After spraying with vanillin and heating, A-28086-I gives a blue spot while the A-28086 antibiotic factors A, B, and D give bright pink spots which quickly turn dark.

Salinomycin is described in U.S. Pat. No. 3,857,948. The structure of salinomycin was reported by H. Kinashi, N. Otake, H. Yonehara, S. Sato and Y. Saito in *Tetrahedron Lett.* 49, 4955–4958 (1973) to be:

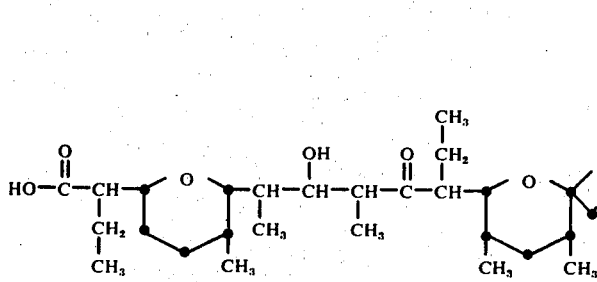

It is apparent that salinomycin and antibiotic A-28086 factors A, B, and D are closely related chemically. We have discovered that these antibiotics uniquely respond to the recovery method of this invention. Other chemically related, polyether antibiotics such as monensin, antibiotic A204I, and antibiotic A-28695A do not respond to this process.

The improved method of antibiotic recovery of this invention comprises acidifying the fermentation broth in which the antibiotic is produced to a pH of from about 2.0 to about 4.0, and separating the antibiotic together with the culture solids.

Although this improved method is useful when the fermentation broth is acidified to a pH of from about 2.0 to about 4.0, the method is most useful at a preferred pH of from about 3.0 to about 3.5. When the method is used at a pH of about 2.0, it is necessary to carry out the separation procedure and the washing and/or extraction procedures fairly promptly in order to prevent degradation of the antibiotic.

The acid used to acidify the fermentation broth can be any one of a number of strong acids, such as, for example, hydrochloric acid, sulfuric acid, nitric acid, and oxalic acid.

Following the acidification of the fermentation broth, it is advantageous to stir the broth for a period of at least one hour in order to complete the precipitation of the antibiotic to be separated. Using the preferred pH range of 3.0–3.5, the fermentation broth can be stirred for as long as 24 hours without affecting the yield of the antibiotic to be recovered.

At this point in the recovery procedure the antibiotic is in the substantially-insoluble free-acid form. In this form the antibiotic is conveniently separated together with the culture solids, including insoluble medium constituents and mycelia. Ordinary separation procedures, such as filtration and centrifugation, may be used to separate the insoluble antibiotic together with the culture solids from the fermentation broth. In large-scale procedures, filtration is a preferred method of separation.

Although this recovery process is useful for either shake-flask or tank fermentation of the antibiotic, it is especially advantageous for large-scale fermentation procedures. By separating the antibiotic together with the culture solids, extraction of a large volume of fermentation broth is avoided. In addition, the use of a large volume of extracting solvent is also avoided. When a large volume of extracting solvent is used, it is necessary either to recover the solvent or to dispose of it in a safe manner. It is, therefore, a great advantage to minimize the amount of extracting solvent used.

The separated culture solids containing the antibiotic may be used directly. For example, the separated culture solids of *Streptomyces albus* ATCC 21,838 containing salinomycin may be used as a source of salinomycin; the separated culture solids of *Streptomyces aureofaciens* NRRL 5758 containing antibiotic A-28086 factor A with minor amounts of A-28086 factors

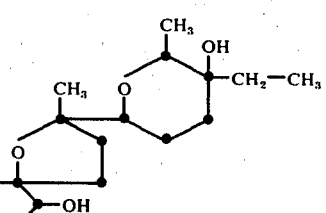

B and D may be used as a source of A-28086 factor A; and the separated culture solids of *Streptomyces aureofaciens* NRRL 8092 containing a mixture of antibiotic A-28086 factor A and factor D (approximately 90% factor A—10% factor D) with a minor amount of A-28086 factor B may be used as a source of this mixture.

When the separated culture solids containing the antibiotic are used as a source of the antibiotic, the separation should be accomplished using a physiologically inert filter aid and should include the additional step of washing the separated solids with an aqueous bicarbonate solution in order to neutralize any excess acidity. After such a washing, the separated culture solids containing the antibiotic may be used directly or may be dried for more convenient administration and/or storage purposes. For example, such a dried-solid preparation containing the desired antibiotic may be mixed directly into feed premix.

When further purification of the antibiotic is desired, the culture solids containing the antibiotic may be extracted with a solvent which separates the antibiotic from the remaining culture solids. Methanol is a preferred solvent for such a separation of the antibiotic from the mycelial mass, but other lower alcohols and ketones are also suitable.

When the antibiotic is separated by extraction, sufficient bicarbonate should be suspended in the extracting solvent in order to neutralize excess acidity. Sodium bicarbonate and potassium bicarbonate are examples of suitable neutralizing agents.

Further purification of the separated antibiotic includes additional extraction and adsorption procedures. Adsorptive materials such as silica gel, carbon, magnesium silicate and the like can be advantageously employed.

In order to illustrate more fully the operation of this invention, the following examples are provided.

EXAMPLE 1

A. Preparation of A-28086 Factors A, B and D

A culture of *Streptomyces aureofaciens* NRRL 5758 was prepared and maintained on an agar slant having the following composition:

| Ingredient | Amount |
|---|---|
| Agar | 20 g. |
| Dextrin | 10 g. |
| Enzyme-hydrolyzed casein | 2 g. |
| Beef extract | 2 g. |
| Yeast extract | 2 g. |
| Distilled water | q.s. 1 liter |

The slant was inoculated with *Streptomyces aureofaciens* NRRL 57581, and the inoculated slant was incubated at 30° C. for 6 to 10 days. The mature slant culture was covered with beef serum, and scraped with a sterile loop to loosen the spores. The resulting beef-serum suspension of spores and mycelial fragments was lyophilized into six pellets.

One lyophilized pellet thus prepared was used to inoculate 50 ml. of a vegetative medium having the following composition:

| Ingredient | Amount |
|---|---|
| Glucose | 20 g. |
| Soybean grits | 15 g. |
| Corn-steep liquor | 10 g. |
| CaCO$_3$ | 2 g. |
| Tap Water | q.s. 1 liter |

The inoculated vegetative medium, in a 250-ml. Erlenmeyer flsk, was incubated at 30° C. for 72 hours on a shaker rotating through an arc 2 inches in diameter at 250 rpm.

The incubated vegetative medium (10 ml.) described above was used to inoculate 400 ml. of a second-stage vegetative growth medium having the same composition as that of the vegetative medium. This second-stage medium, in a 2-liter flask, was incubated at 30° C. for 24 hours on a shaker rotating through an arc 2 inches in diameter at 250 rpm.

This second-stage vegetative medium (800 ml.) was used to inoculate 100 liters of sterile production medium of the following composition:

| Ingredient | Amount |
|---|---|
| Tapioca dextrin* | 80.0 g/l. |
| Enzyme-hydrolyzed casein** | 6.0 g/l. |
| Enzymatic-hydrolysate of casein*** | 2.0 g/l. |
| (NH$_4$)$_2$SO$_4$ | 1.0 g/l. |
| CaCO$_3$ | 2.0 g/l. |
| MgSO$_4$ . 7H$_2$O | 0.5 g/l. |
| Blackstrap molasses | 15.0 g/l. |
| Refined soybean oil | 5.0 ml/l. |
| Tap Water | q.s. 1 liter |

*Staley Dextrin, No. 11, A.E. Staley Co., Decatur, Ill.
**Amber EHC, Amber Laboratories, Juneau, Wisconsin
***NZ Amine A, Sheffield Chemical Co., Norwich, N.Y.

The pH of the medium was about 6.7 after sterilization by autoclaving at 120° C. for 30 minutes at 15–20 pounds pressure. The inoculated production medium was allowed to ferment in a 165-liter fermentation tank for 10–12 days at about 28° C. The fermentation medium was aerated with sterile air at the rate of 0.4 volumes of air per volume of culture medium per minute. The medium was stirred with conventional agitators at 250 rpm.

B. Recovery of A-28086 Factors A, B and D

Whole fermentation broth (81 liters) thus prepared was acidified with dilute HCl to pH 3 and was maintained at that pH while stirring for one hour. Filter aid (3% weight/volume) was added, and the resulting mixture was filtered to give filtered broth (64 liters, assaying at less than 10 mcg/ml A-28086 activity) and moist mycelial solids containing antibiotic A-28086 factor A and minor amounts of A-28086 factors B and D.

C. Dried-Solid Preparation Containing A-28086 Factor A

The moist mycelial solids, obtained as described in Sections A and B, are washed well with 16.5 liters of 5% aqueous NaHCO$_3$ solution. The washed mycelial solids thus obtained are dried under vacuum at room temperature to give a dried-solid preparation containing A-28086 factor A and minor amounts of A-28086 factors B and D.

D. Separation of A-28086 Complex Containing Factors A, B, and D

The moist mycelial solids obtained as described in Sections A and B were extracted twice with methanol (70 liters each, containing 3–5% w/v suspended NaHCO$_3$). The combined methanol extracts were concentrated under vacuum to remove the methanol. The resulting aqueous solution (about 10 liters) was acidified to about pH 7.5 with dilute HCl; this solution was extracted twice with equal volumes of ethyl acetate (10 liters each). The combined ethyl acetate extracts were concentrated under vacuum to dryness to give the A-28086 complex of antibiotics containing major factor A and minor factors B and D.

E. Isolation of Purified A-28086 Factor A

The A-28086 complex of antibiotics thus obtained was dissolved in acetone (1.5 liters). Water (1.5 liters) was added, and the solution was acidified to pH 3 with dilute HCl, stirring for one hour. The precipitate which formed was separated by filtration. The separated precipitate was redissolved in acetone (1.5 liters). Water (400 ml.) was added to this acetone solution, and crystallization was allowed to proceed overnight. The crystals were separated by filtration and dried under vacuum at room temperature to give 94.0 g. of antibiotic A-28086 factor A (85% yield).

F. Isolation of Purified A-28086 Factors A and B

The A-28086 complex of antibiotics obtained as described in Section D is dissolved in benzene and chromatographed on a silica gel column (Matheson grade 62). The column is eluted with varying benzene-ethyl acetate mixtures. Elution progress is followed by thin-layer chromatography. Using a benzene-ethyl acetate (90:10) solvent system, A-28086 factor B is eluted first and is crystallized from acetone-water.

Continuing to elute with benzene-ethyl acetate mixtures, but gradually increasing the ratio of ethyl acetate present, A-28086 factor A is eluted and is crystallized from acetone-water.

EXAMPLE 2

A. Preparation of A-28086 Factors A, B, and D

A culture of *Streptomyces aureofaciens* NRRL 8092 was prepared and maintained on an agar slant having the following composition:

| Ingredient | Amount |
|---|---|
| K$_2$HPO$_4$ | 2 g. |
| MgSO$_4$ . 7H$_2$O | 0.25 g. |
| NH$_4$NO$_3$ | 2 g. |
| CaCO$_3$ | 2.5 g. |
| FeSO$_4$ . 7H$_2$O | 0.001 g. |
| MnCl$_2$ . 7H$_2$O | 0.001 g. |
| ZnSO$_4$ . 7H$_2$O | 0.001 g. |
| Glucose | 10 g. |
| Agar | 20 g. |
| Deionized water | q.s. 1 liter |
| pH (unadjusted) | 7.7 |

The slant was inoculated with *Streptomyces aureofaciens* NRRL 8092, and the inoculated slant was incubated at 30° C. for about 7 days. The mature slant culture was covered with sterile beef serum and was scraped with a sterile loop to prepare a spore and mycelial suspension from the slant culture. The resulting suspension was lyophilized into a maximum of six pellets.

One of the lyophile pellets thus prepared was used to inoculate 50 ml. of a vegetative medium having the following composition:

| Ingredient | Amount |
|---|---|
| Glucose | 20 g. |
| Soybean flour | 15 g. |
| Corn steep liquor | 10 g. |
| CaCO$_3$ | 2 g. |
| Tap water | q.s. 1 liter |
| pH adjusted to pH 6.5 with dill NaOH | |

The inoculated vegetative medium, in a 250-ml. Erlenmeyer flask, was incubated at 30° C. for 48 hours on a rotary shaker at 250 rpm with a two-inch arc. In order to produce a larger volume of inoculum, 10 ml. of the incubated vegetative medium was used to inoculate 400 ml. of a second-stage vegetative medium having the same composition as that of the vegetative medium. This second-stage medium, in a 2-liter Erlenmeyer flask, was incubated at 30° for 24 hours on a rotary shaker at 250 rpm with a two-inch arc.

After incubation, the second-stage vegetative medium (800 ml) was used to inoculate 100 liters of sterile fermentation medium having the following composition:

| Ingredient | Amount |
|---|---|
| Tapioca dextrin* | 60.0 g/l. |
| Enzyme-hydrolyzed casein** | 6.0 g/l. |
| Enzymatic-hydrolysate of casein*** | 2.0 g/l. |
| CaCO$_3$ | 2.0 g/l. |
| MgSO$_4$ . 7H$_2$O | 0.5 g/l. |
| Black strap molasses | 15.0 g/l. |
| Refined soybean oil | 5.0 ml/l. |
| Tap water | q.s. 1 liter |

*Staley Dextrin No. 11, A.E. Staley Co., Decatur, Ill.
**Amber EHC, Amber Laboratories, Juneau, Wisconsin
***NZ Amine A, Sheffield Chemical Co., Norwich, N.Y.

The pH of the medium was 6.8 ± 0.1 after sterilization by autoclaving at 121° C. for 30 minutes at 15–20 pounds pressure. In a 165-liter fermentation tank, the inoculated production medium was allowed to ferment for 10–12 days at 28° ± .1° C. The fermentation medium was aerated with sterile air at the rate of 0.4 volumes of air per volume of culture medium per minute. The medium was stirred with conventional agitators at 300 rpm.

B. Recovery of A-28086 Factors A, B and D

Whole fermentation broth (60 liters) thus obtained was ajusted to pH 3 by the addition of dilute HCl. The resulting mixture was filtered using a filter aid (Hyflo-Super-cel, a diatomaceous earth, Johns-Manville Products Corp.) to give moist mycelial solids containing A-28086 factors A and D in a ratio of about 90:10 and, additionally, minor A-28086 factor B.

C. Purification of A-28086 Factors A and D

The mycelial solids thus prepared were extracted with 30 liters of methanol, adding 1.56 kg. of NaHCO$_3$ to the extract with stirring. After separation of this extract, the mycelial cake was again extracted with another 30 liters of methanol. The two methanol extracts were combined and concentrated under vacuum to remove the methanol. The remaining aqueous solution (about 7 liters) was adjusted to pH 7.5 with dilute HCl. The resulting solution was extracted twice with ethyl acetate (7-liter portions). The ethyl acetate extracts were combined and concentrated under vacuum to give an oily residue. This oily residue was dissolved in 1500 ml. of acetone. Water (1500 ml) was added to the acetone solution. The resulting solution was adjusted to pH 3 with dilute HCl and was stirred one hour. The precipitate which had formed was separated by filtration and then was dissolved in acetone (1500 ml); water (400 ml) was added to this solution. The resulting solution was allowed to stand for 16 hours for crystallization to occur. The crystals formed were separated by filtration and dried under vacuum to give 74 g. crude crystalline product containing A-28086 factors A and D and other crystalline impurities.

This crude crystalline product (40 g.) was dissolved in about 250 ml. of benzene. The benzene solution was then applied to a silica-gel column (9- × 120-cm column; Grace-Davidson grade 62 silica gel). The column was eluted successively with 40 liters of each of the following:
1. benzene 2. benzene:ethyl acetate (9:1) 3. benzene:ethyl acetate (4:1) 4. benzene:ethyl acetate (7:3) 5. benzene:ethyl acetate (1:1) 6. ethyl acetate 7. methanol One-liter fractions were collected. Each fraction was checked by assay against *Bacillus subtilis* and by thin-layer chromatography to identify the eluted compounds. A-28086-I was eluted with benzene:ethyl acetate (4:1). A-28086 factor B was eluted with benzene:ethyl acetate (7:3). A-28086 factors A and D were eluted in the fractions obtained with benzene:ethyl acetate (7:3 and 1:1), fractions 119-156. These fractions were combined and evaported to dryness under vacuum. The residue thus obtained was dissolved in acetone (500 ml). Water (500 ml) was added to the acetone solution, and the resulting solution was adjusted to pH 3 with dilute HCl and was stirred for one hour. The precipitate which formed was separated by filtration and was crystallized from acetone (500 ml)-water (180 ml). The crystals thus formed were separated by filtration and dried under vacuum to give 20.1 g. of a mixture of A-28086 factors A and D.

This mixture (18.8 g) was dissolved in benzene (50 ml). The benzene solution was applied to a silica-gel column (7- × 100-cm column; E. Merck grade 60 silica gel, finer than 230 mesh ASTM). The column was eluted, at a flow rate of 90 ml. per hour, successively with
1. 12 liters of benzene
2. 12 liters of benzene:ethyl acetate (9:1)
3. 12 liters of benzene:ethyl acetate (4:1)
4. 32 liters of benzene:ethyl acetate (7:3)
5. 10 liters of methanol Thin-layer cellulose chromatography (Merck Darmstadt cellulose on aluminum support) was followed by *B. subtilis* bioautography to monitor the elution procedure. The following solvent system was used: water:methanol:acetone (12:3:1), adjusting the solution first to pH 10.5 with $NH_4OH$ and then to pH 7.5 with HCl.

One- to two-liter fractions were collected until activity was detected; then 200-ml. fractions were collected. The fractions containing only A-28086 factor D were combined and evaporated under vacuum to a residue. This residue crystallized from acetone-water (1:1). The crystals were separated and dried under vacuum to give 140 mg. of crystalline A-28086 factor D.

The fractions containing A-28086 factor D with a trace of A-28086 factor A were treated in the same manner to give an additional 150 mg. of crystalline A-28086 factor D containing a small amount of A-28086 factor A.

The fractions containing only A-28086 factor A were also treated in the same manner to give 4.7 g. of crystalline A-28086 factor A.

EXAMPLE 3

A. Preparation of Salinomycin

Salinomycin is prepared as described in U.S. 3,857,958 by inoculation of *Streptomyces albus* 80614 (ATCC 21,838) into 100 liters of a liquid medium containing:

| Ingredient | Amount |
|---|---|
| Glucose | 2.0% |
| Starch | 1.0% |
| Soybean flour | 2.5% |
| Beer yeast | 2.0% |
| Meat extract | 0.2% |
| NaCl | 0.2% |
| Water | 92.1% | in a 200-liter stainless-steel tank at pH 7.0. The mixture is allowed to ferment for 84 hours at 27° C. The fermentation medium is aerated with sterile air at the rate of 100 liters/minute, stirring with conventional agitators at 250 rpm.

B. Recovery of Salinomycin

Whole fermentation broth thus prepared is acidified with dilute HCl to pH 3.5 and maintained at that pH while stirring for one hour. Filter aid (3 percent weight-/volume) is added, and the resulting mixture is filtered to give moist mycelial solids containing salinomycin.

C. Dried-Solid Preparation Containing Salinomycin

The moist mycelial solids obtained as described in Sections A and B are washed well with 20 liters of 5% aqueous $KHCO_3$ solution. The washed mycelial solids thus obtained are dried under vacuum at room temperature to give a dried-solid preparation containing salinomycin.

We claim:
1. The process of recovering an antibiotic selected from the group consisting of antibiotic A-28086 factor A, antibiotic A-28086 factor B, antibiotic A-28086 factor D, and salinomycin, which process comprises acidifying the whole fermentation broth in which said antibiotic is produced to a range of from about pH 2.0 to about pH 4.0 and separating the culture solids containing said antibiotic.
2. The process of claim 1 which includes the additional step of extracting said antibiotic from the culture solids with a suitable solvent.
3. The process of claim 1 wherein the antibiotic is antibiotic A-28086 factor A.
4. The process of claim 1 wherein the antibiotic is antibiotic A-28086 factor B.
5. The process of claim 1 wherein the antibiotic is antibiotic A-28086 factor D.

6. The process of claim 1 wherein the antibiotic is salinomycin.

7. The process of claim 2 wherein the antibiotic is antibiotic A-28086 factor A.

8. The process of claim 2 wherein the antibiotic is antibiotic A-28086 factor B.

9. The process of claim 2 wherein the antibiotic is antibiotic A-28086 factor D.

10. The process of claim 2 wherein the antibiotic is salinomycin.

* * * * *